(12) United States Patent
Hoshino et al.

(10) Patent No.: US 7,762,203 B2
(45) Date of Patent: Jul. 27, 2010

(54) DISCRIMINATION MEDIUM AND ARTICLE HAVING THE SAME

(75) Inventors: Hidekazu Hoshino, Yokohama (JP); Hiroyuki Matsumoto, Yokohama (JP); Jyunyou Nakagawa, Kurashiki (JP); Masaki Shibata, Chiyoda-ku (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 866 days.

(21) Appl. No.: 11/631,175

(22) PCT Filed: Jun. 29, 2005

(86) PCT No.: PCT/JP2005/011987

§ 371 (c)(1),
(2), (4) Date: Dec. 29, 2006

(87) PCT Pub. No.: WO2006/008931

PCT Pub. Date: Jan. 26, 2006

(65) Prior Publication Data

US 2009/0178601 A1   Jul. 16, 2009

(30) Foreign Application Priority Data

Jul. 15, 2004   (JP) ............................... 2004-208499

(51) Int. Cl.
*D05B 93/00* (2006.01)
*D05B 97/00* (2006.01)

(52) U.S. Cl. .................................................... 112/439

(58) Field of Classification Search ............... 112/439, 112/104, 273, 475.17, 475.18; 428/357–372; 28/217, 218
See application file for complete search history.

(56) References Cited

U.S. PATENT DOCUMENTS

| | | | |
|---|---|---|---|
| 3,313,941 A | | 4/1967 | Marks |
| 4,756,557 A | * | 7/1988 | Kaule et al. ..................... 283/85 |
| 4,880,256 A | * | 11/1989 | Ferre-Blanquez ............ 283/92 |
| 5,854,148 A | * | 12/1998 | Asada et al. ................. 442/203 |
| 6,326,094 B1 | * | 12/2001 | Asano et al. ................... 428/38 |
| 2003/0194578 A1 | | 10/2003 | Tam et al. |

(Continued)

FOREIGN PATENT DOCUMENTS

| | | |
|---|---|---|
| EP | 001500725 A1 * | 1/2005 |
| JP | A 63-275774 | 11/1988 |

(Continued)

*Primary Examiner*—Ismael Izaguirre
(74) *Attorney, Agent, or Firm*—Oliff & Berridge, PLC

(57) ABSTRACT

An embroidery 202 is formed by sewing a polarizing fiber onto a suitable cloth 201. The polarizing fiber is composed of a polymer to which a polarization developing material is added and which is stretched after spinning. The embroidery 202 has seams arranged in a predetermined direction. The polarizing fiber exhibits different optical characteristics for a linearly polarized light having an electric field component in the stretched direction of the polymer (the extending direction of the fiber) and for a linearly polarized light having an electric field component perpendicular to that of the above linearly polarized light. Therefore, when a discrimination medium 200 is viewed through a polarization plate, the appearance of the embroidery 202 changes depending on the direction (rotation position) of the polarization plate, so that a discriminating function can be obtained. Even when the discrimination medium 200 is used for an article (for example, a garment), it is difficult to separate the discrimination medium 200 from the article.

5 Claims, 5 Drawing Sheets

U.S. PATENT DOCUMENTS

2008/0136979 A1* 6/2008 Hoshino et al. ................ 349/1
2009/0121436 A1* 5/2009 Perkins ...................... 273/298

FOREIGN PATENT DOCUMENTS

| JP | A 04-144796 | 5/1992 |
| JP | A 07-102415 | 4/1995 |
| JP | A 09-127334 | 5/1997 |
| JP | A 10-130946 | 5/1998 |
| JP | A 2002-242085 | 8/2002 |
| WO | WO 03/054259 A1 | 7/2003 |

* cited by examiner

Fig. 5A
Fig. 5B
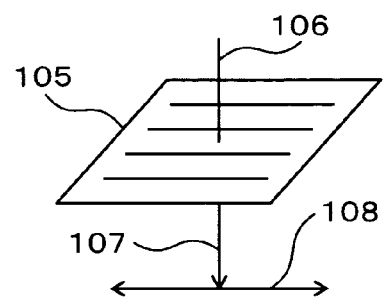
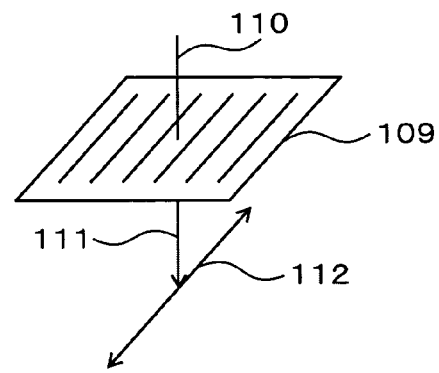
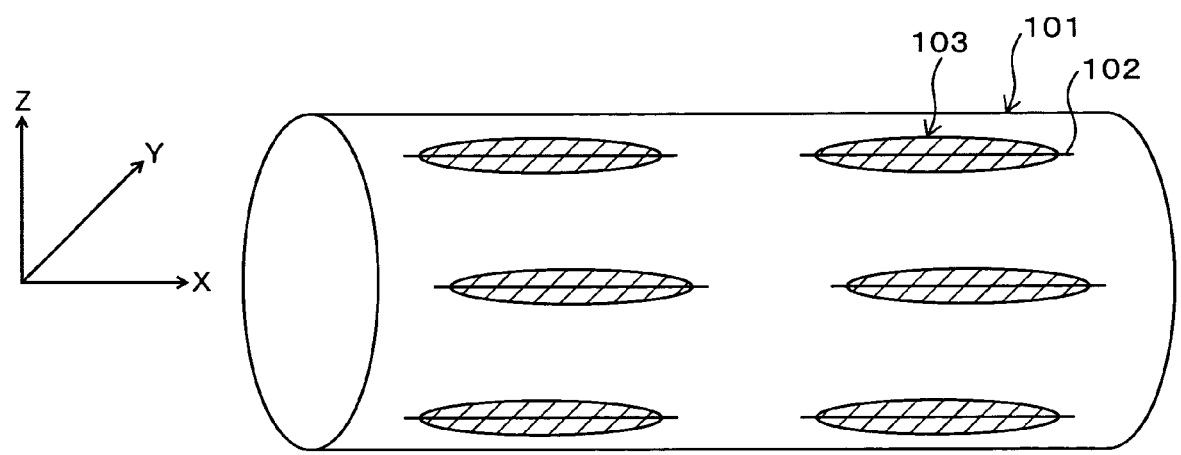

DISCRIMINATION MEDIUM AND ARTICLE HAVING THE SAME

TECHNICAL FIELD

The present invention relates to techniques for determining whether or not articles are authentic by using optical effects. In particular, the present invention relates to a discrimination medium having an optical discriminating functional fiber sewn thereto.

BACKGROUND ART

Counterfeits of articles (for example, goods and garments), which are produced by copying appearances of authentic ones, are being sold, and they cause problems. Under these circumstances, in order to ensure performance, reliability and security of articles and to maintain the worthiness of the brands of articles, techniques for verifying the authenticity of the article are required.

A method in which printing is performed on an article by using a special ink or a method in which a chip having special reflection characteristics is applied onto an article may be used as a technique for verifying the authenticity of the article.

In the above method using the special ink printed on an article, for example, a predetermined character or a figure is printed on an article by using an ink, which is fluorescent under ultraviolet light, as the above ink. When ultraviolet light is irradiated on the article, the character or the figure becomes visible on the article, so that the authenticity of the article can be determined. For example, an ink having particles of a magnetic material or magnetized particles mixed therewith may be applied on an article, and the authenticity of the article can be verified by using magnetic sensors.

In the above method using the chip having special reflection characteristics, a chip using optical characteristics of a cholesteric liquid crystal formed thereon is used as the above chip. For example, this technique using optical characteristics of the cholesteric liquid crystal is disclosed in Japanese Unexamined Patent Application Publication No. H4-144796. A seal having a hologram function is known.

In a method for verifying the authenticity of garments, there is known a technique in which an micro-embroidery which cannot be seen with the unaided eye is formed and a pattern thereof is verified by using a magnifying lens. In addition, there is known a technique in which an embroidery is formed by using a fiber having a fluorescent function and a pattern thereof becomes visible by irradiating a light (for example, ultraviolet light) in a predetermined wavelength range.

DISCLOSURE OF THE INVENTION

Problems Solved by the Invention

However, since a discrimination medium having a special ink or a cholesteric liquid crystal layer may be applied on an article and be used, the discrimination medium may be separated from the article and be reused. An affixing method for preventing separation of a discrimination medium from an article has been proposed. In this case, if the article is a cloth, a pair of shoes, or a bag, the design is degraded, and it is therefore difficult to use the affixing method.

The above method using the fluorescent fiber needs to be improved in because the special ink is necessary and the optical discriminating function must be good.

An object of the present invention is to provide a discrimination technique which can prevent separation of an discriminating function from an article even when the article is a cloth. Another object of the present invention is to provide a discrimination technique which can provide good discriminating functions without using a special light source compared to embroidery in which a discriminating function is provided using fluorescent fibers.

Means for Solving the Problems

First, optical characteristics of a polarizing fiber according to the present invention will be explained. FIGS. 5A and 5B are conceptual diagrams which show a structural example of a polarizing fiber according to the present invention. Conceptually speaking, the polarizing fiber is a polarizing fiber 101 having main chains 102 and pigments 103 (polarization developing materials). The main chains 102 are main portions of the fiber 101 and are composed of a polymer material. The pigments 103 are wreathed around the main chains 102 therealong.

In this structure of the polarizing fiber 101, as shown in FIG. 5A, for example, the polarizing fiber 101 is viewed through a polarization plate 105 which allows a light polarized in an X direction (a linearly polarized light having an electric field component in the X direction) to selectively pass therethrough.

In this case, X direction polarized light 107 having an electric field component 108 in the X direction is irradiated onto the polarizing fiber 101. Since the pigments 103 extend in the X direction, the electric field component 108 is efficiently reflected by the pigments 103. Therefore, when the polarizing fiber 101 is viewed through the polarization plate 105, the polarizing fiber 101 exhibits the colors of the pigments 103.

On the other hand, as shown in FIG. 5B, for example, when the polarizing fiber 101 is viewed through the polarization plate 109 which allows a light polarized in a Y direction (a linearly polarized light having an electric field component in the Y direction) to selectively pass therethrough, since an oscillation of an electric field component 112 of a Y direction polarized light 111 which enters the polarizing fiber 101 is perpendicular to the extending directions of the pigments 103, the reflection efficiency of the Y direction polarized light 111 by the pigments 103 is low. Therefore, when the polarizing fiber 101 is viewed through the polarization plate 109, the reflection of colors of the pigments 103 is weak and the light absorption amount in the case shown in FIG. 5B is more than that in the case shown in FIG. 5A, so that the polarizing fiber 101 appears to be nearly dark.

In accordance with the above principle, when the polarizing fiber 101 is embroidered as a warp or a weft and the embroidery is viewed through the polarization plate, the appearance of the embroidery changes by selecting the polarization direction of the polarization plate, and the embroidery can be seen in a unique manner.

According to one aspect of the present invention, a discrimination medium uses the above principle of the optical characteristics. The discrimination medium includes: a substrate; an embroidery which is sewn to the substrate and is composed of a polymer fiber stretched in a longitudinal direction; a polarization developing material which is included in the polymer fiber of the embroidery; and discrimination information which is exhibited by the embroidery, wherein the discrimination information is obtained from the embroidery by observing the discrimination medium through a polarization plate.

In the discrimination medium of the present invention, since the embroidery is composed of the fiber which efficiently reflects a light polarized in a predetermined direction corresponding to the stretched direction of the fiber, that is, a linearly polarized light having an electric field component in the stretched direction. Therefore, when the embroidery is viewed through the polarization plate which allows a predetermined linearly polarized light to selectively pass therethrough, the appearance of the embroidery greatly changes so that the embroidery is easily visible or not easily visible depending on the direction of the polarization plate. As a result, the discrimination medium can obtain a discriminating function by the embroidery. The authenticity thereof can be determined by using the discriminating function.

In a desirable embodiment of the discrimination medium of the present invention, the embroidery has seams arranged in a predetermined direction. By arranging the seams in a predetermined direction, optical characteristics of a light polarized in a direction corresponding to the predetermined direction of the seams is very different from those of a light polarized in a direction perpendicular to the predetermined direction of the seams. Therefore, the discriminating function of the discrimination medium can be better.

In a desirable embodiment of the discrimination medium of the present invention, the color of the polarization developing material is selected, so that the color information is used as a discrimination function. Therefore, more complicated optical characteristics can be used in the determination of the authenticity.

In a desirable embodiment of the discrimination medium of the present invention, the embroidery has predetermined figure information. In this feature, unique optical characteristics are obtained in which a special logo emerges from the embroidery by observing the embroidery through the polarization plate. The determination of the authenticity can be performed effectively.

In a desirable embodiment of the discrimination medium of the present invention, the embroidery has plural portions which have seams having the directions which are different from each other. In this feature, for example, when the plural portions of the embroidery are viewed by rotating the polarization plate, each predetermined portion of the embroidery emerges depending on the rotation angle of the polarization plate, so that optical characteristics which facilitate discriminating the embroidery can be obtained.

In a desirable embodiment of the discrimination medium of the present invention, the substrate is a cloth. In this feature, a logo, a pattern or the like is sewn directly on a woven label (tag) of a garment or a portion of a garment, a discriminating function can be provided thereto. It is difficult to separate the discrimination medium, which is formed by sewing, from the garment. In addition, it is difficult to ravel the sewn fiber of the embroidery and reproduce an embroidery having the same function as described above. The discrimination medium can thereby be reliably used to determine the authenticity.

In another aspect of the present invention, as shown in FIGS. 2A and 2B, a polarizing fiber is sewn to a cloth, and the cloth is a portion (for example, a collar) of a product (for example, outerwear) which is an article. This article of the present invention is not limited to cloth (for example, a garment), and may be a material to which the fiber can be sewn. The material may be a fur or a paper.

The embroidery formed by sewing of the present invention may be a simple linear seam mark. For example, the embroidery can be used as a binding thread for booklet (for example, a passport) which requires an anti-falsification method. In this case, the binding thread is observed through a polarization plate, so that unique optical characteristics emerge in the appearance of the binding thread. Therefore, the determination of the authenticity can be performed.

The polymer which is a main portion of the polarizing fiber used in the present invention need not be limited so long as the polymer can be subjected to melt spinning. In a desirable embodiment of the present invention, the polymer material is a material which has good affinity for a dye in the polarization developing, has good transparency, and can be easily subjected to melt spinning and to stretching.

The above polymer may be a polyester (for example, polyvinyl alcohol, ethylene-vinylalcohol copolymer, polyethylene terephthalate, or polybutylene terephthalate). When the polymer is ethylene-vinylalcohol copolymer, a fiber having a flat and smooth surface can be obtained, and a dichroic direct dye which is inexpensive and is good in polarization can be used as the polarization developing material. Thus, the ethylene-vinylalcohol copolymer is desirable as the polymer.

The polarization developing material has optical characteristics in which light enters the polarization developing material and the polarization developing material absorbs light having an oscillation surface in a predetermined direction and generates light polarized in a direction perpendicular to the predetermined direction. The polarization developing material may be a direct dye (dichroic direct dye) composed of a dichroic organic pigment. The dichroic direct dye may be one selected from the group consisting of an azo-based dye, a tolidine-based dye, a dianisidine-based dye, a benzidine-based dye, and stilbene-based dye or mixture thereof.

The included amount of the dichroic direct dye with respect to the polymer may be an appropriate range. When the included amount of the dichroic direct dye with respect to the polymer is small, sufficient polarization characteristics cannot be obtained. On the other hand, when the included amount of the dichroic direct dye with respect to the polymer is large, light transmission is decreased. In these cases, the contrast is deteriorated. In consideration of these cases, the included amount of the dichroic direct dye in the polymer may be 0.02 to 1.0 mass % and is desirably 0.05 to 0.8 mass %.

The cross sectional structure of the polarizing fiber of the present invention may be of various shapes (for example, a circle, an ellipse, and a plane). The fiber diameter of the polarizing fiber depends on the intended use and may be ten μm to several hundred μm. The polarizing fiber may be monofilament or multifilament, and it is desirably multifilament from the point of view of flexibility.

For example, a method for mixing a polarization developing material with a fiber is a method in which a polymer and a polarization developing material are mixed with each other before the polymer is formed into a fiber, or a method in which a fiber into which a polymer was formed is immersed and included in a solution or a fluid dispersion including polarization developing material. The former method is desirable since the polarization developing material is effectively oriented in the former method.

The spinning may be a typical spinning method. From the point of view of heat resistance of the polarization developing material, it is important that melting be performed at as low a temperature as possible, which is not more than the melting point thereof +30 degrees C., and the duration time in the melting may be as short as possible.

The polarizing fiber obtained by spinning may be subjected to stretching to develop the polarization characteristics. The stretching temperature may be from a glass transition point (=Tg) of the polymer to Tg+60 degrees.

EFFECTS OF THE INVENTION

In the present invention, the discriminating function can be obtained by sewing the polarizing fiber onto the discrimination medium. Therefore, even when the article provided to the discriminating function is a garment, it is difficult to separate the discriminating function from the article. As a result, it is difficult to falsify the discrimination medium, and the discriminating function can provide a good ability to determine the authenticity. The discriminating function can be good without using a special light source compared to embroideries which have a discriminating function using fluorescent fibers.

BRIEF DESCRIPTION OF DRAWINGS

FIGS. 5A and 5B are conceptual diagrams which show a principle of an optical function of a polarizing fiber of an embodiment according to the present invention.

EXPLANATION OF REFERENCE NUMERALS

101 denotes a polarizing fiber, 102 denotes a main chain, 103 denotes a polarization developing material, 105 denotes a polarization plate, 106 denotes an entering light (white natural light), 107 denotes a polarized light, 108 denotes a polarized direction, 109 denotes a polarization plate, 110 denotes an entering light (white natural light), 111 denotes a polarized light, 112 denotes a polarized direction, 200 denotes a discrimination medium, 201 denotes a cloth, 202 denotes an embroidered logo, 204 denotes a polarization plate allowing a Y direction polarized light to selectively pass therethrough, 206 denotes a polarization plate allowing an X direction polarized light to selectively pass therethrough, 210 denotes a compound polarization plate, 211 denotes a polarization plate allowing a Y direction polarized light to selectively pass therethrough, 212 denotes a polarization plate allowing an X direction polarized light to selectively pass therethrough, 301 denotes a discrimination medium, 302 denotes a cloth, 303 denotes an embroidery, 304 denotes an embroidery having seams arranged in a Y direction, 305 denotes a polarization plate allowing a Y direction polarized light to selectively pass therethrough, 306 denotes a polarization plate allowing an X direction polarized light to selectively pass therethrough, 401 denotes a discrimination medium, 402 denotes a cloth, 403 denotes an embroidery having seams arranged in a Y direction, 404 denotes an embroidery having seams arranged in a Y direction, 405 denotes a polarization plate allowing a Y direction polarized light to selectively pass therethrough, and 406 denotes a polarization plate allowing an X direction polarized light to selectively pass therethrough.

BEST MODE FOR CARRYING OUT THE INVENTION

1. First Embodiment

Figure 1A:
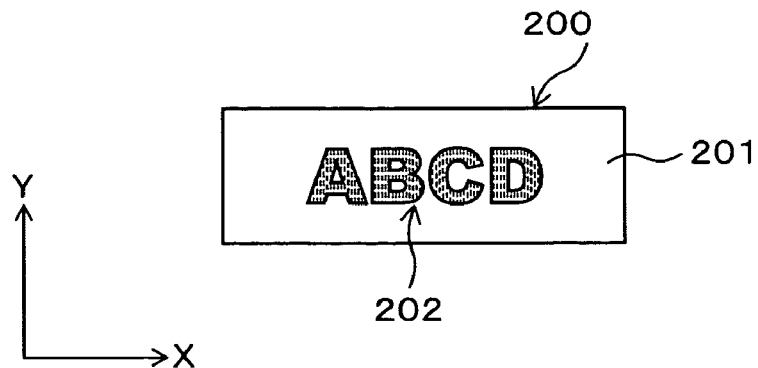
FIGS. 1A to 1C are front views which show a discrimination medium of an embodiment according to the present invention and a practical condition thereof.
Figure 1B:
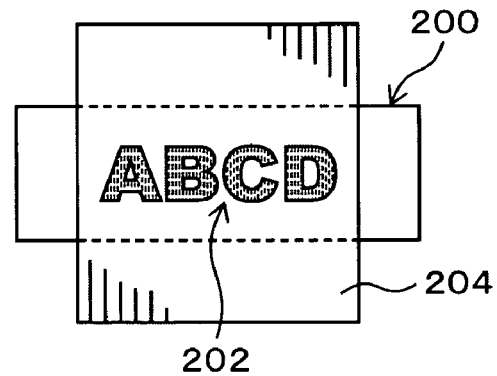
Figure 1C:
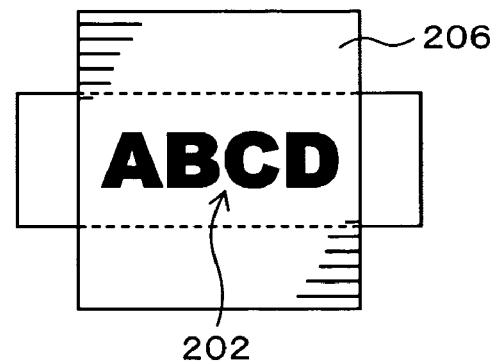

In the embodiment, a polarization developing material is added to a polymer of a fiber, and the polymer is spun and stretched, so that a polarizing fiber which exhibits polarization is obtained. An embroidery 202 is formed by sewing the polarizing fiber to a suitable cloth 201 so as to have seams arranged in a predetermined direction as shown in FIGS. 1A to 1C. The polarizing fiber exhibits optical characteristics which are different between a case in which a linearly polarized light, which has an electric field component parallel to a stretched direction of the polymer (which is an extending direction of the fiber), is irradiated onto the fiber, and a case in which a linearly polarized light, which has an electric field component perpendicular to the stretched direction of the polymer, is irradiated onto the fiber. Therefore, when a discrimination medium 200 having the cloth 201 and the embroidery 202 is viewed through a polarization plate, the appearance of the embroidery 202 changes depending on the direction (rotation position) of the polarization plate, so that a discriminating function of the discrimination medium 200 can be obtained.

1.1. Structure of First Embodiment

FIGS. 1A to 1C are front views showing a discrimination medium of the embodiment according to the present invention and practical conditions of the discrimination medium. As shown in FIGS. 1A to 1C, the discrimination medium 200 has a suitable cloth 201 as a substrate and the embroidery 202 which is composed of the polarizing fiber and is sewn to the cloth 201.

As shown in FIG. 1A, for example, a logo of four characters "ABCD" is used as the embroidery 202. The polarizing fiber is sewn to the cloth 201, so that the embroidery 202 has seams having directions which are parallel to a Y direction. That is, the directions of the seams are parallel to upper and lower directions on the sheet of the FIG. 1A. The cloth 201 is composed of a typical fiber.

For example, the discrimination medium 200 shown in FIG. 1A can be used for a weave label of the cloth. The weave label is a tag which is sewn to the nape of the neck, and is a piece of cloth on which words (for example, a brand name) are displayed.

In this example, the embroidery 202 is composed of polarizing fiber which appears to be green on white cloth 201.

1.2. Function of First Embodiment

In the condition shown in FIG. 1A, when the discrimination medium 200 is directly observed, the logo "ABCD" appears to be green on the white background.

Next, as shown in FIG. 1B, an example will be explained in which a polarization plate 204 which allows a light polarized in the Y direction to selectively pass therethrough is disposed above the discrimination medium 200 which is shown in FIG. 1A and the discrimination medium 200 is observed under white natural light. The light polarized in the Y direction is a linearly polarized light having an electric field component in the Y direction. The white natural light is not polarized in a predetermined direction and is a white light which is not biased in spectrum in a predetermined visible wavelength region.

In this example shown in FIG. 1B, a light polarized in the Y direction which is parallel to the directions of the seams of the embroidery 202 (that is, an extending direction of the polarizing fiber) enters the embroidery 202. In this case, in accordance with the principle explained using FIGS. 5A and 5B, since the entering light is reflected by the polarizing fiber of the embroidery 202, the embroidery 202 shown in FIG. 1B appears to be less clear than that shown in FIG. 1A. This is because the amount of the light is decreased by the polarization plate 204 in the example shown in FIG. 1B.

Next, as shown in FIG. 1C, an example will be explained in which a polarization plate 206 which is set by rotating the polarization plate 204 by 90 degrees is disposed above the discrimination medium 200. In this example, a light polarized in the X direction, which is perpendicular to the directions of the seams of the embroidery 202 (that is, the extending direction of the polarizing fiber), enters the embroidery 202. In this case, in accordance with the principle explained using FIGS. 5A and 5B, since a large amount of the entering light passes through the polarizing fiber of the embroidery 202, the embroidery 202 appears to be nearly black. That is, although the embroidery 202 appears to be green in FIGS. 1A and 1B, the embroidery 202 appears to be black in FIG. 1C.

In the above manner, a discriminating function can be obtained such that the embroidered logo can be seen in a unique manner depending on the direction of the polarization plate.

In the embodiment, instead of positioning the polarization plate above the discrimination medium, a method may be used in which light enters from a suitable light source to a polarization plate, a linearly polarized light is thereby obtained, and the linearly polarized light is irradiated onto the discrimination medium. In this method, a change in the appearance of the embroidered logo can be seen in the above manner by changing a polarization direction of a polarized light irradiated thereon, or by changing a light irradiated thereon between natural light (which is not polarized in a predetermined direction) and a polarized light.

Figure 2A:
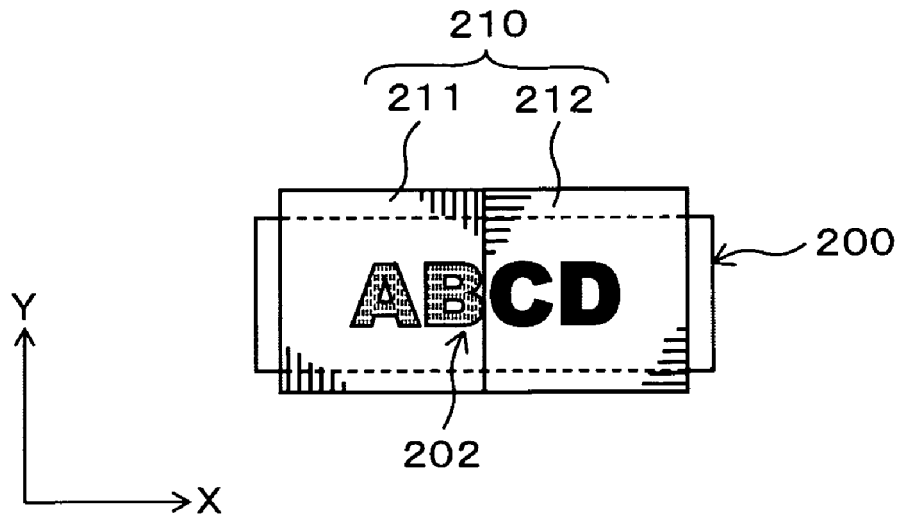
FIGS. 2A and 2B are front views which show a discrimination medium of an embodiment according to the present invention and a practical condition thereof.
Figure 2B:
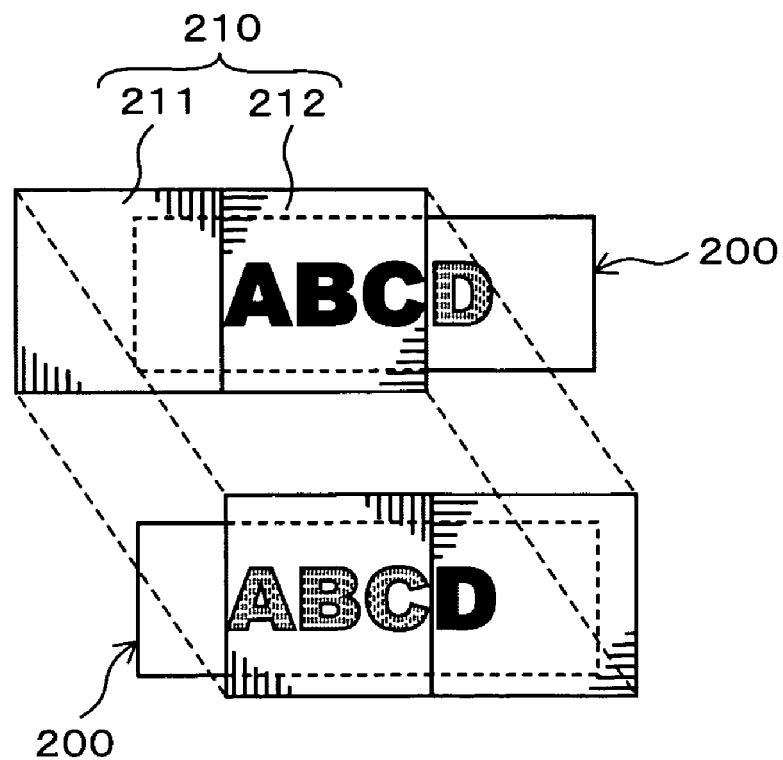

FIGS. 2A and 2B are front views showing conditions in which the discrimination medium 200 is observed by using a compound polarization plate which has two polarization plates having polarizing directions perpendicular to each other. As shown in FIG. 2A, a compound polarization plate 210 having polarization plates 211 and 212 which are connected to each other on the left side and the right side is disposed above the discrimination medium 200. The polarization plate 211 allows a light polarized in the Y direction to selectively pass therethrough. The polarization plate 212 allows a light polarized in the X direction to selectively pass therethrough.

In this example, since the polarization plate 211 allows a light polarized in the Y direction to selectively pass therethrough, the appearance of the characters "AB" of the embroidery 202 is approximately the same as that in the case which does not use the polarization plate. However, since the polarization plate 212 allows a light polarized in the X direction to selectively pass therethrough, the light passes through a portion of the characters "CD" of the embroidery 202, so that the characters "CD" of the embroidery 202 appears to be black. That is, the characters "CD" appear to be black in comparison with the characters "AB".

When the compound polarization plate 210 is moved in the direction (which is parallel to the left and right directions on the sheet of the Figure), as shown in FIG. 2B, the portion of the characters which appear to be clearly black is moved. The authenticity determination based on the appearance of the logo "ABCD" can be obtained by using this phenomenon.

In the embodiment, the optical function can be obtained such that the brightness change of the characters or the like of the embroidery can be seen between dark and bright by using the polarization plate. The authenticity determination of the article can be performed by using the optical function. Since the fiber is used, various colors can be used, so that the discrimination medium can be seen in a unique manner. As a result, it is difficult to falsify the discrimination medium. Since the discriminating function can be provided directly to a product or the like by sewing, the provided portion of the discriminating function to the product can be freely selected, and the discriminating function can be integrated with the product and cannot be separated therefrom.

1.3. Production Method of First Embodiment

An example will be explained in which a polyester is used as the polymer and a direct dichroic dye is used as the polarization developing material. For example, 0.2 mass % of a blue direct dichroic dye which is a product "DIRECT DARK-GREEN BA" of Sumitomo Chemical Co., Ltd. is dissolved into ethylene glycol, so that a dye solution is produced. Next, an eval chip "ES-G110A" of KURARAY CO., LTD. is dissolved as a material at a temperature of 180 degrees C. Next, the above dye solution is mixed thereinto such that the die concentration in the polymer is 0.3%, and it is kneaded by a double-shaft kneading machine. The mixture is vacuum-dried at a temperature of 105 degrees C. so that a green colored chip is obtained. Instead of the eval chip "ES-G110A" of KURARAY CO., LTD., a thermoplastic resin (for example, a polyester resin or a nylon resin) can be used as the material.

The colored chip is spun from a mouth ring at a winding speed of 500 m/minute at a temperature of 180 degrees C. The mouth ring has a mouth diameter of 0.2 mm and six holes. Next, the spun colored chip is stretched to be 2.5 times as long as the initial size thereof by a stretching machine having a roller temperature of 70 degrees C. and a plate temperature of 120 degrees C., so that a polarizing fiber having a fineness of 175 dtex is obtained.

The polarizing fiber has a strength of 3.1 cN/dtex and a rate of elongation of 26%. Plural polarizing fiber are arranged in a line, so that a sheet form having a size of 1×1 cm$^2$ is obtained, so that a polarization degree and a transmission factor of the sheet form are measured. As a result, the polarization degree is 71% and the transmission factor is 41%.

The measurement of the polarization degree is performed based on a polarization degree measurement method using a polarization plate of LD-201 of the EJAJ Standard. The measurement of the transmission factor for the visible light wavelength region is performed based on a polarization degree measurement method using a polarization plate of LD-2521 of the EJAJ Standard.

2. Second Embodiment

Figure 3A:
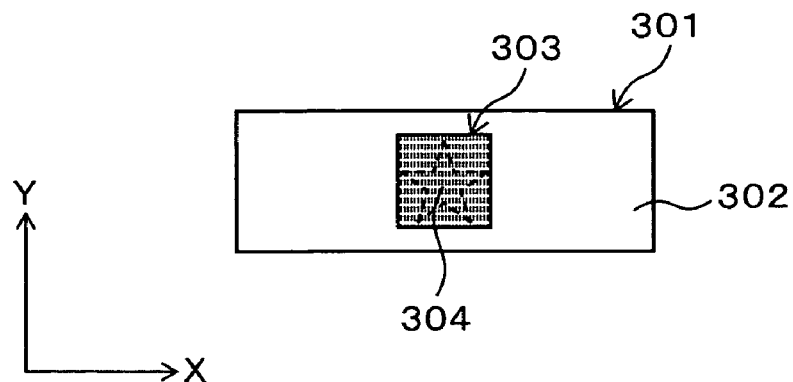
FIGS. 3A to 3C are front views which show a discrimination medium of an embodiment according to the present invention and a practical condition thereof.
Figure 3B:
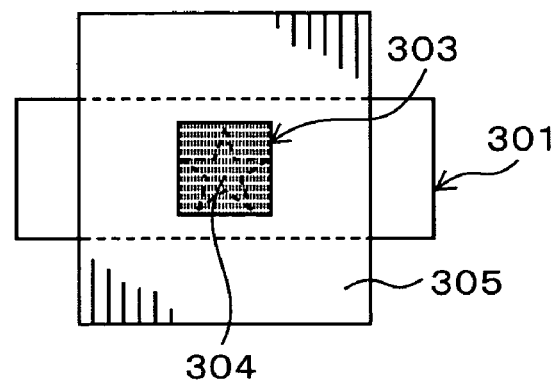
Figure 3C:
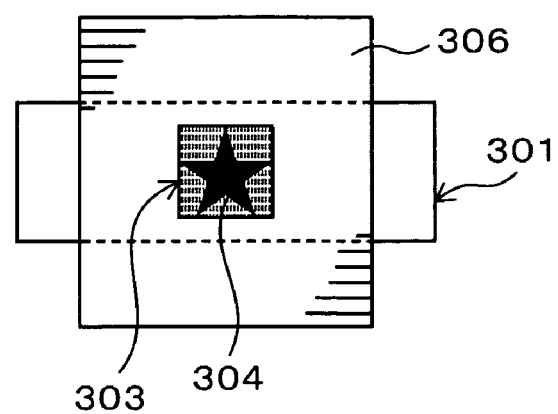

FIGS. 3A to 3C are schematic front views which show another discrimination medium of the embodiment according to the present invention and practical conditions thereof. In an example shown in FIGS. 3A to 3C, a discrimination medium 301 has a square embroidery 303 and a star embroidery 304. The square embroidery 303 is formed by sewing a typical fiber, which has a predetermined color and is different from the polarizing fiber of the present invention, to a suitable cloth 302. The star embroidery 304 is formed by sewing the polarizing fiber of the first embodiment onto the square embroidery 303.

In this example, the embroidery 304 has seams having directions which extend along a Y direction in the Figures. That is, the extending directions of the seams of the embroidery 304 correspond to the Y direction. In this example, the colors of the embroideries 303 and 304 are selected such that the embroideries 303 and 304 exhibit the same color when they are directly seen with the unaided eye. Therefore, when the discrimination medium 301 is viewed directly with the unaided eye, it is difficult to recognize the star embroidery 304.

As shown in FIG. 3B, a polarization plate 305 which allows a Y direction polarized light to selectively pass therethrough is disposed above the discrimination medium 301 shown in FIG. 3A. In this case, since Y direction polarized light reaches the discrimination medium 301, the reaching light is reflected thereby. Therefore, although the brightness is decreased a little, the appearance of the discrimination medium 301 shown in FIG. 3B is approximately the same as that shown in FIG. 3A.

Next, an example will be explained in which a polarization plate which allows a linearly polarized light, which is polarized perpendicularly to the polarizing direction of the polarization plate 305, to selectively pass therethrough is disposed above the discrimination medium 301. This condition is shown in FIG. 3C. As shown in FIG. 3C, a polarization plate 306 which allows an X direction polarized light to selectively pass therethrough is disposed above the discrimination medium 301.

In this case, since X direction polarized light selectively passes through the polarization plate 306 and it reaches the discrimination medium 301, the amount of reflected light by a portion of the embroidery 304, of which the seam direction corresponds to the Y direction, is smaller than that by the surrounding portion. Therefore, the embroidery 304 emerges to be black. That is, the latent image effects can be obtained such that the figure of the embroidery 304, which is not easily seen without using the polarization plate, emerges to be black by rotating the polarization plate.

In the embodiment, the latent image effects can be obtained such that the predetermined figure is almost invisible to the unaided eye and it emerges and is seen through the polarization plate. The degree of the effects can be set variously by adjusting the combination of the colors of the fibers.

In addition, by application of the embodiment, an optical function can be obtained such that the predetermined figure is visible with the unaided eye and another figure is further seen through the polarization plate.

3. Third Embodiment

Figure 4A:
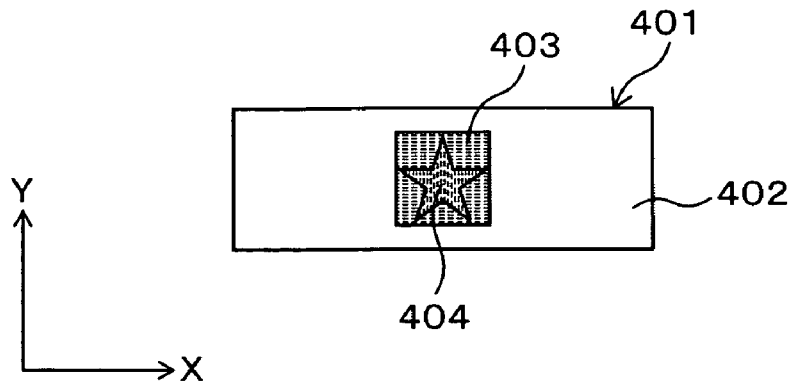
FIGS. 4A to 4C are front views which show a discrimination medium of an embodiment according to the present invention and a practical condition thereof.
Figure 4B:
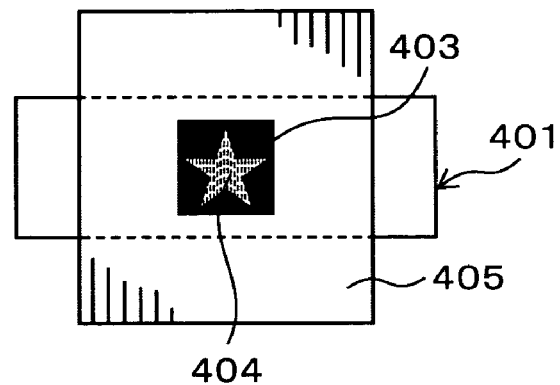
Figure 4C:
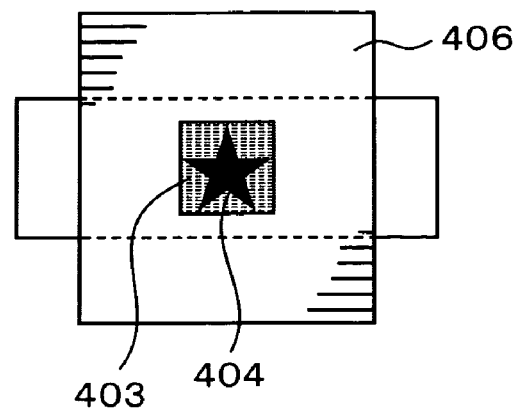

FIGS. 4A to 4C are schematic front views which show another discrimination medium of the embodiment according to the present invention and practical conditions thereof. In an example shown in FIGS. 4A to 4C, a discrimination medium 401 has embroideries 403 and 404 which are formed on a suitable cloth 402. The embroidery 403 has seams having directions which are parallel to an X direction. The embroidery 404 has seams having directions which are parallel to a Y direction.

In this example, the embroideries 403 and 404 are composed of the same polarizing fiber as that in the first embodiment and appear to be green when they are observed with the unaided eye.

As shown in FIG. 4A, the discrimination medium 401 is directly observed. In this condition, since the embroideries 403 and 404 do not exhibit optical characteristics of the polarizing fiber for polarized light, it is difficult to distinguish the embroideries 403 and 404 from each other.

As shown in FIG. 4B, a polarization plate 405 which allows a Y direction polarized light to selectively pass therethrough is disposed above the discrimination medium 401. In this case, since Y direction polarized light passes through the polarization plate 405, the entering light to the star embroidery 404 having the seam directions which are parallel to the Y direction is reflected by the star embroidery 404 to some degree. However, the entering light to the embroidery 403 having seam directions which are parallel to the X direction is reflected by the embroidery 403 more weakly than the light reflected by the star embroidery 404. Therefore, the square embroidery 403 appears to be black and the star embroidery 404 emerges to be green on the square embroidery 403.

Next, a case will be explained in which a polarization plate 406 is disposed above the discrimination medium 401 instead of the polarization plate 405. The polarization plate 406 allows a polarized light (X direction polarized light), which has a polarized direction perpendicular to the polarizing direction of the polarization plate 405, to selectively pass therethrough. This condition is the same as a condition in which the polarization plate 405 is rotated by 90 degrees.

As shown in FIG. 4C, the polarization plate 406 which allows an X direction polarized light to selectively pass therethrough is disposed above the discrimination medium 401. In this case, since X direction polarized light passes through the polarization plate 406, the entering light to the star embroidery 404 having the seam directions which are parallel to the Y direction is not almost reflected by the star embroidery 404. The entering light to the square embroidery 403 having the seam directions which are parallel to the X direction is reflected by the square embroidery 403 more strongly than the light reflected by the star embroidery 404. Therefore, the square embroidery 403 emerges to be green and the star embroidery 404 appears to be black on the square embroidery 403.

When the same polarizing fiber is used and the embroideries having the seam directions which are 90 degrees different from each other are formed, a discriminating function can be obtained such that the figure changes by rotating the direction of disposed polarization plate (polarized direction of polarized light passing therethrough) by 90 degrees. That is, a display figure changing function can be obtained.

In the embodiment, the seam directions of the embroideries are 90 degrees different from each other. Alternatively, when the difference angle of the seam directions of the embroideries are other than 90 degrees, optical characteristics in which the figure is differently seen can be obtained depending on the direction of the polarization plate.

4. Another Embodiment

The sewing can be performed such that intervals between the seams of the polarizing fiber vary along the direction of the seams gradually or in a stepped manner. In this case, the appearance of the seams seen through the polarization plate changes continuously or in a stepped manner. For example, when the logo "ABCD" is embroidered as a weft in a width direction, the sewing is performed such that the exposed ratio of the polarizing fiber on the portion "B" of the embroidery is smaller that on the portion "A" of the embroidery and the exposed ratio of the polarizing fiber on the portion "C" of the embroidery is smaller that on the portion "B" of the embroidery. In this case, when the logo is viewed through the polarization plate, the logo can be seen such that the brightness from the portion "A" to the portion "C" of the embroidery is decreased in a stepped manner.

The seam mark of the embroidery may have a curved shape instead of a linear shape. In this case, when the embroidery is observed by moving the polarization plate, moving image effects can be obtained such that the figure of the embroidery appears to move.

A micro-character which is invisible to the unaided eye may be formed by embroidering the polarizing fiber. In this case, when the polarizing plate is used together with a magnifying lens, the discrimination medium can provide predetermined visual information.

The polarizing fiber of the present invention may be used with a fluorescent fiber. In this case, a discrimination function can be obtained by using the polarization plate together with an ultraviolet lamp for irradiating ultraviolet beam on the discrimination medium. The polarizing fiber and the fluorescent fiber may be twisted and formed into one fiber and this fiber may be used. The polarizing fiber of the present invention may be twisted with a typical fiber so that one thread is obtained. Polarization fibers including different polarization developing materials may be twisted with each other so that one thread is obtained.

INDUSTRIAL APPLICABILITY

The present invention can be applied to techniques for providing an authenticity determination function to a woven label or the like which is installed to a garment. In addition, the present invention can be applied to techniques for directly providing a discrimination medium having a discriminating function to goods by sewing.

The invention claimed is:

1. A discrimination medium comprising:
   a substrate;
   an embroidery which is sewn to the substrate and is composed of a polymer fiber stretched in a longitudinal direction; and
   a polarization developing material which is included in the polymer fiber of the embroidery, wherein
   the substrate has plural embroideries collectively forming a display figure, each embroidery forming a different display figure portion;
   the embroideries have seams arranged at different directions from each other; and
   when the display figure is observed through a polarization plate, the observed display figure is changed according to a rotational angle of the polarization plate.

2. A discrimination medium according to claim 1, wherein the embroidery has predetermined figure information.

3. A discrimination medium according to claim 1, wherein the substrate is a cloth.

4. An article having a discrimination medium, the discrimination medium comprising:
   a substrate;
   an embroidery which is sewn to the substrate and is composed of a polymer fiber stretched in a longitudinal direction; and
   a polarization developing material which is included in the polymer fiber, wherein
   the substrate has plural embroideries collectively forming a display figure, each embroidery forming a different display figure portion;
   the embroideries have seams arranged at different directions from each other;
   when the display figure is observed through a polarization plate, the observed display figures is changed according to a rotational angle of the polarization plate;
   the article is a product; and
   a portion of the product is the substrate of the discrimination medium.

5. An article having a discrimination medium, according to claim 4, wherein the substrate is a cloth.

* * * * *